United States Patent
Bagepalli et al.

(10) Patent No.: US 6,732,055 B2
(45) Date of Patent: May 4, 2004

(54) METHODS AND SYSTEMS FOR ENERGY AND EMISSIONS MONITORING

(75) Inventors: Srinivas Krishnasnamy Bagepalli, Niskayuna, NY (US); Lynn Ann DeRose, Gloversville, NY (US); Stephen Lan-Sun Hung, Waterford, NY (US); Bang Mo Kim, Schenectady, NY (US); Tara Healy Wight, Voorheesville, NY (US); Joseph James Salvo, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 09/682,991

(22) Filed: Nov. 6, 2001

(65) Prior Publication Data

US 2003/0088370 A1 May 8, 2003

(51) Int. Cl.$^7$ .............................................. G05B 21/00
(52) U.S. Cl. ........................... 702/32; 702/62; 702/188; 700/266
(58) Field of Search ......................... 702/30–32, 22–24, 702/27, 60–62, 122, 179, 181, 182, 183, 187, 188, 1, FOR 139, FOR 155, FOR 170, FOR 171, FOR 115–FOR 121, FOR 134, FOR 135; 73/23.2, 23.36; 700/266, 291, 274; 340/870.01, 870.02, 870.16, 632, 5.9; 705/412, 8.37; 706/904–907, 912–915, 930, 934; 422/62, 82.04, 89

(56) References Cited

U.S. PATENT DOCUMENTS

| | | | | | |
|---|---|---|---|---|---|
| 5,905,975 | A | * | 5/1999 | Ausubel | 705/37 |
| 5,970,426 | A | * | 10/1999 | Mandel et al. | 700/274 |
| 6,341,287 | B1 | * | 1/2002 | Sziklai et al. | 705/8 |
| 6,522,994 | B1 | * | 2/2003 | Lang | 702/183 |
| 2002/0052828 | A1 | * | 5/2002 | Ausubel | 705/37 |
| 2002/0065581 | A1 | * | 5/2002 | Fasca | 700/266 |

OTHER PUBLICATIONS

Leyden et al., "Real–Time Analysis of NOx Emissions Using Expert Systems", 1993, Advances in Instrumentation and Control: International Conference and Exhibition v 48 pt 2 1993, pp. 1443–1453.*

Salerno et al., "Air Emissions Monitoring System for Predictive Maintenance and Environmental Compliance", Oct.–Dec. 1997, Power Handling & Processing v 9 n 4, pp. 364–366.*

Matsushita et al., "Air Environment Monitoring System on Distributed Data Processing" (with translation), 1995, Instrumentation and Control Technology Special, R & D Kobe Steel Engineering Reports, vol. 45, No. 3, pp. 15–18.*

Cortes et al., "Benefits of Computer Systems Integration for Energy Management in Coal Power Stations", 1992, Thermodynamics and the Design, Analysis, and Improvement of Energy Systems—1992, ASME, vol. 27, pp. 91–99.*

(List continued on next page.)

Primary Examiner—Hal Wachsman
(74) Attorney, Agent, or Firm—Phillip D. Freedman; Patrick K. Patnode

(57) ABSTRACT

Methods, systems, and processes are disclosed for determining emissions outputs. One method communicates with a communications network and acquires at least one of energy usage information associated with sources of emissions and emissions information associated with sources of emissions. The energy usage information and the emissions information is acquired as each occurs in real time. The method reports emissions outputs based upon the acquired real time information. Another method communicates with a communications network and acquires at least one of energy usage information associated with sources of emissions and emissions information associated with sources of emissions. This embodiment stores the acquired information as each occurs in real time. Emissions outputs are reported for the industrial process, the emissions outputs based upon the acquired real time information.

24 Claims, 6 Drawing Sheets

OTHER PUBLICATIONS

Yongqi et al., "The Status and Future Scenarios for China's Energy–Related GHG Emissions", 1998, International Conference on Air Pollution—Proceedings 1998, pp. 527–536.*

Clement, "Monitoring Environmental Pollution in Real Time and on a Global Basis By Meansof Differential Computation", 1991, International Conference on Environmental Pollution Proc Int Conf Environ Pollut, pp. 82–89.*

Concurrently filed, copending patent application RD–27684, Bang Mo Kim et al., entitled "Methods and Systems for Reducing Waste and Emissions From Industrial Processes" U.S. application Ser. No. 09/682,995, filed Nov. 6, 2001.

Concurrently filed, copending patent application RD–28079, Stephen L. Hung et al., entitled "Methods and Systems for Monitoring Water Usage", U.S. application Ser. No. 09/994,035 filed Nov. 6, 2001.

* cited by examiner

METHODS AND SYSTEMS FOR ENERGY AND EMISSIONS MONITORING

BACKGROUND OF INVENTION

This invention generally relates to air quality management and, more particularly, to methods and systems for monitoring and predicting emissions outputs from emissions sources.

The United States Congress requires reductions in annual emissions of sulfur dioxide and nitrogen oxides. See Clean Air Act (Title IV, Acid Rain Program) §401, 42 U.S.C.A. §7651 (West 1995 & Supp. 2000). Congress requires that any operator of an emissions source, subject to the laws, must sample the emissions source and record sulfur dioxide and nitrogen oxide emissions. This record of sulfur dioxide and nitrogen oxide emissions must then be submitted to the United States Environmental Protection Agency.

Sampling and reporting these emissions, however, can be a slow, cumbersome, and expensive task. Emissions monitoring equipment ("CEMS" for continuous emissions monitoring system), required by Congress, can cost up to about $200,000 per unit. One CEMS is often required for each source, so an industrial process with multiple sources can require a million dollars or more in emissions monitoring equipment. This emissions monitoring equipment also has high installation costs and high maintenance costs. There are also high lead times and high labor costs in gathering this emissions data and in presenting the data in the format required by the United States Environmental Protection Agency. Once this emissions data is gathered and reported, added expenses are incurred to archive thousands of pages of emissions documents and regulatory submissions.

There is, accordingly, a need in the art for methods and systems of inexpensively monitoring source emissions, for methods and systems of inexpensively predicting source emissions, for methods and systems of quickly gathering, formatting, and reporting emissions data to regulatory agencies, and for methods and systems that facilitate sharing emissions data for buying and selling emissions allowances.

SUMMARY OF INVENTION

One embodiment includes a method for determining emissions outputs from an industrial process, a commercial process, or a residence. The method communicates with a communications network and acquires at least one of energy usage information associated with sources of emissions and emissions information associated with sources of emissions. "Sources of emissions" includes any machine, apparatus, plant, or process that emits pollutants. Boilers, furnaces, generators, and engines, for example, consume energy and produce emissions. The energy usage information and the emissions information is acquired as each occurs in real time or as each occurs in near-real-time. The method reports emissions outputs based upon the acquired real time information.

Another embodiment includes a method for determining emissions outputs from an industrial process. This embodiment communicates with a communications network and acquires at least one of energy usage information associated with sources of emissions and emissions information associated with sources of emissions. This embodiment stores the acquired information as each occurs in real time. Emissions outputs are reported for the industrial process, the emissions outputs based upon the acquired real time information.

A further embodiment is a method for displaying energy and emissions information. This embodiment stores present values of at least one of i) energy usage information and ii) emissions information as each occurs in real time. The energy usage information is associated with sources of emissions, and the emissions information is associated with sources of emissions. An image is displayed, with the image comprised of the stored present values.

Still another method of displaying energy and emissions information is disclosed. This method stores present values of at least one of i) energy usage information and ii) emissions information as each occurs in real time. The energy usage information is associated with sources of emissions, and the emissions information is associated with sources of emissions. The method stores emissions output information, with the emissions output information based upon at least one of the energy usage information and the emissions information. A computer image is displayed, the computer image comprised of at least one of i) the energy usage information, ii) the emissions information, and the iii) emissions output information.

An industrial process is also disclosed. The industrial process includes an emissions source producing pollutant emissions, at least one monitor monitoring the emissions source, and a communications network. The at least one monitor has at least one of i) an energy usage monitor for monitoring energy usage of the emissions source in real time and ii) an emissions monitor for monitoring emissions produced by the emissions source in real time. The energy usage monitor generates energy usage information and the emissions monitor generates emissions information. The communications network acquires at least one of the energy usage information and the emissions information, with the communications network communicating in real time the energy usage information and the emissions information.

A system configured for predicting emissions from an emissions source is also disclosed. The system includes an Emissions Monitoring Module, a memory storage device, and a processor. The Emissions Monitoring Module acquires at least one of energy usage information and emissions information. The energy usage information is associated with energy used by the emissions source, and the emissions information is associated with emissions outputs produced by the emissions source. The memory storage device stores the acquired information. The processor generates emissions outputs for the emissions source based upon the acquired information.

DETAILED DESCRIPTION

Figure 1:
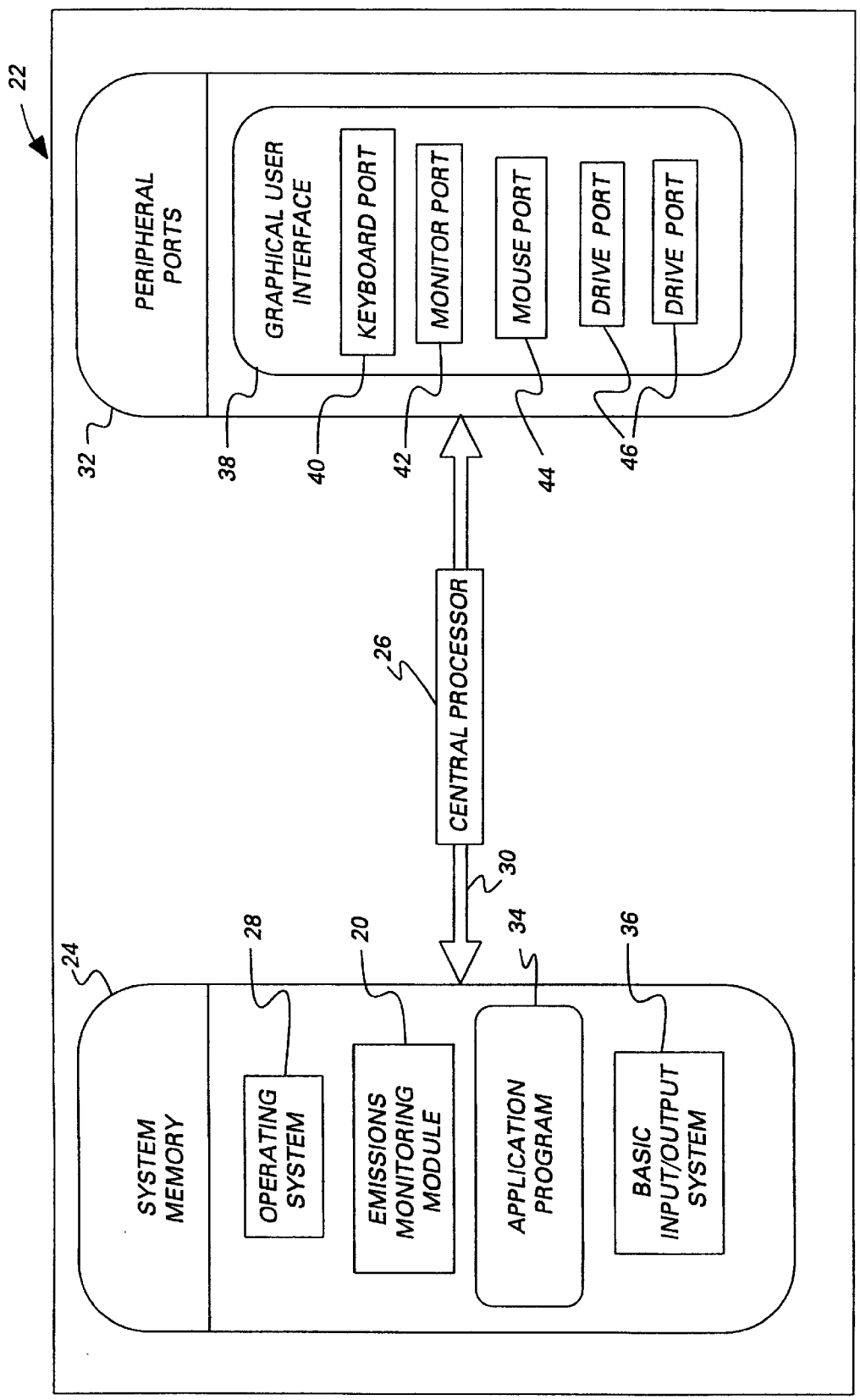
FIG. 1 is a block diagram showing an Emissions Monitoring Module residing in a computer system.
Figure 2:
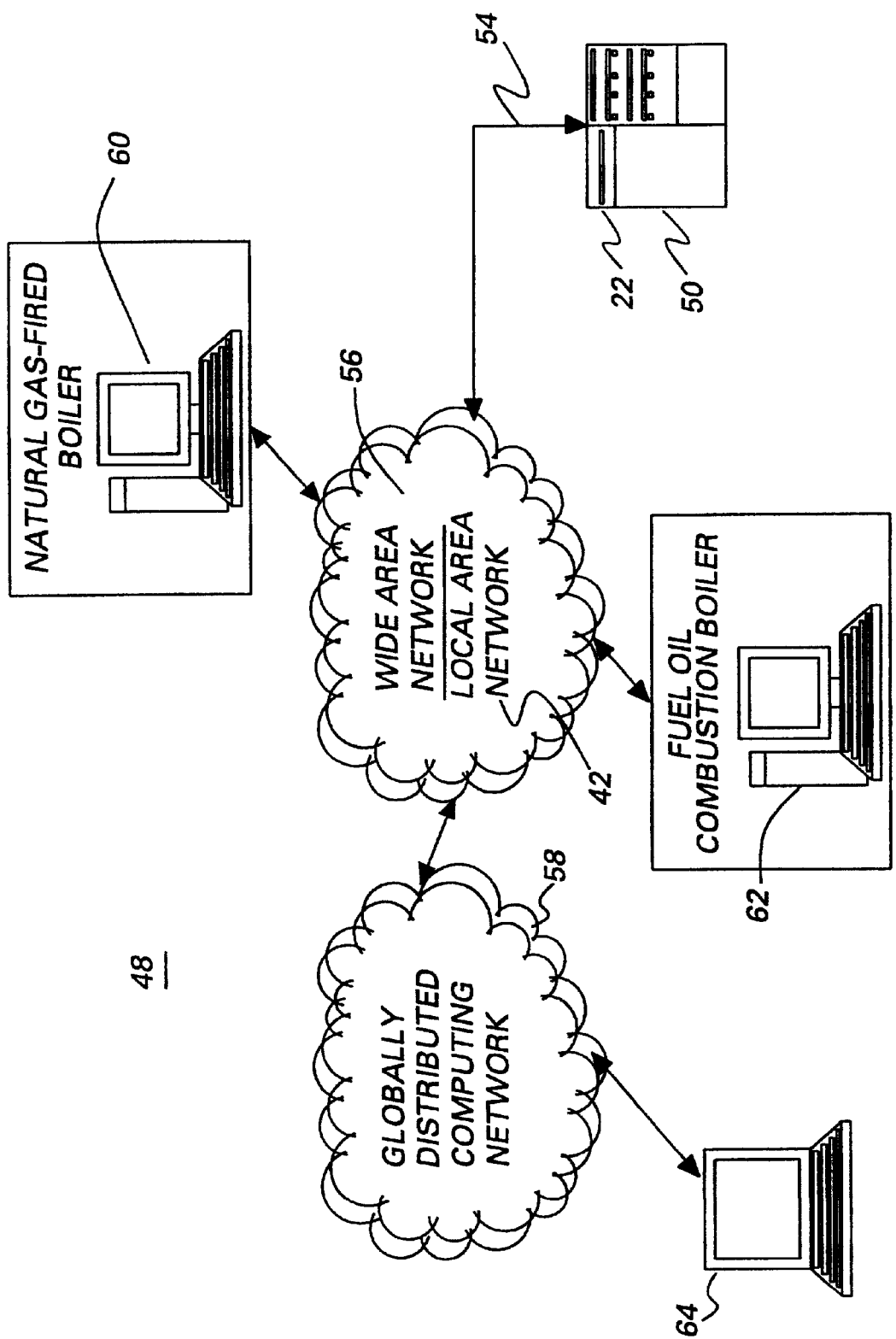
FIG. 2 is a block diagram of a communications network further representing an operating environment for the Emissions Monitoring Module.

FIGS. 1 and 2 depict a possible computer operating environment for an embodiment of the present invention.

This embodiment of an Emissions Monitoring Module 20 comprises a computer program that acquires information and predicts pollutant emissions. As those skilled in the art of computer programming recognize, computer programs are depicted as process and symbolic representations of computer operations. Computer components, such as a central processor, memory devices, and display devices, execute these computer operations. The computer operations include manipulation of data bits by the central processor, and the devices maintain the data bits in data structures. The process and symbolic representations are understood, by those skilled in the art of computer programming, to convey the discoveries in the art.

FIG. 1 is a block diagram showing the Emissions Monitoring Module 20 residing in a computer system 22. The Emissions Monitoring Module 20 may be stored within a system memory device 24. The computer system 22 also has a central processor 26 executing an operating system 28. The operating system 28 also resides within the system memory device 24. The operating system 28 has a set of instructions that control the internal functions of the computer system 22. A system bus 30 communicates signals, such as data signals, control signals, and address signals, between the central processor 26, the system memory device 24, and at least one peripheral port 32. Those of ordinary in the art understand that the program, processes, methods, and systems described in this patent are not limited to any particular computer system or computer hardware.

Those skilled in art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufacturers also offer microprocessors. Such other manufacturers include Motorola, Inc. (1303 East Algonquin Road, P.O. Box A3309 Schaumburg, Ill. 60196), International Business Machines Corp. (New Orchard Road, Armonk, N.Y. 10504, (914) 499-1900, and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacturer's central processor.

The system memory 24 also contains an application program 34 and a Basic Input/Output System (BIOS) program 36. The application program 34 cooperates with the operating system 28 and with the at least one peripheral port 32 to provide a Graphical User Interface (GUI) 38. The Graphical User Interface 38 is typically a combination of signals communicated along a keyboard port 40, a monitor port 42, a mouse port 44, and one or more drive ports 46. The Basic Input/Output System 36, as is well known in the art, interprets requests from the operating system 28. The Basic Input/Output System 36 then interfaces with the keyboard port 40, the monitor port 42, the mouse port 44, and the drive ports 46 to execute the request.

The operating system 28 is WTNDOWS® (WINDOWS® is a registered trademark of Microsoft Corporation, One Microsoft Way, Redmond Wash. 98052-6399, 425.882.8080). WINDOWS® is typically preinstalled in the system memory device 24. Those skilled in the art also recognize many other operating systems are suitable, such as UNIX® (UNIX® is a registered trademark of the Open Source Group), LINUX, and MAC® OS (Mac® is a registered trademark of Apple Computer, Inc., 1 Infinite Loop, Cupertino, Calif. 95014, 408.996.1010). Those skilled in the art again understand that the program, processes, methods, and systems described in this patent are not limited to any particular operating system.

FIG. 2 is a block diagram of a communications network 48. This communications network 48 further represents an operating environment for the Emissions Monitoring Module (shown as reference numeral 20 in FIG. 1). The Emissions Monitoring Module resides within the memory storage device (shown as reference numeral 24 in FIG. 1) in the computer system 22. The computer system 22 is shown as a server 50. The server 50 may communicate with a Local Area Network (LAN) 52 along one or more data communication lines 54 or via wireless interfaces. As those of ordinary skill have long understood, the Local Area Network 52 is a grid of communication lines through which information is shared between multiple nodes. These multiple nodes are conventionally described as network computers. As those of ordinary skill in the art also recognize, server 50 could also communicate with a Wide Area Network (WAN) 56 and with a globally-distributed computing network 58 (the "Internet"). The communications network 48 allows the server 50 to request and to acquire information from many other computers connected to the Local Area Network 52, the Wide Area Network 56, and the globally-distributed computing network 58.

As FIG. 2 shows, the server 50 may request and acquire information from many computers connected to the communications network 48. The server 50, for example, may acquire information from a boiler computer 60 monitoring a natural gas-fired boiler. The boiler computer 60 commonly monitors the rate of usage of natural gas by the boiler. The rate of usage of natural gas is commonly measured by a flow meter, and the flow meter is then monitored by the boiler computer 60. The boiler computer 60, in some instances, may sample emissions from the natural gas-fired boiler. Such emissions may include, but are not limited to, nitrogen oxides ($NO_x$), carbon monoxide (CO), carbon dioxide ($CO_2$), methane ($CH_4$), nitrous oxide ($N_2O$), sulfur dioxide ($SO_2$), volatile organic compounds, and particulate matter. The server 50 could also acquire information from a fuel oil operation computer 62 monitoring a fuel oil combustion boiler. The fuel oil operation computer may monitor emissions and fuel oil usage of the fuel oil combustion boiler. FIG. 2 also shows that remote users, such as environmental engineers, Environmental Protection Agency regulators, and plant operators, may use a remote computer 64 to access the communications network 48 and to remotely access the server 50. Because many computers may be connected to the communications network 48, computers and computer users may share and communicate a vast amount of information acquired and processed by the Emissions Monitoring Module. The Emissions Monitoring Module thus permits on-line, real-time energy and emissions monitoring.

Figure 3:
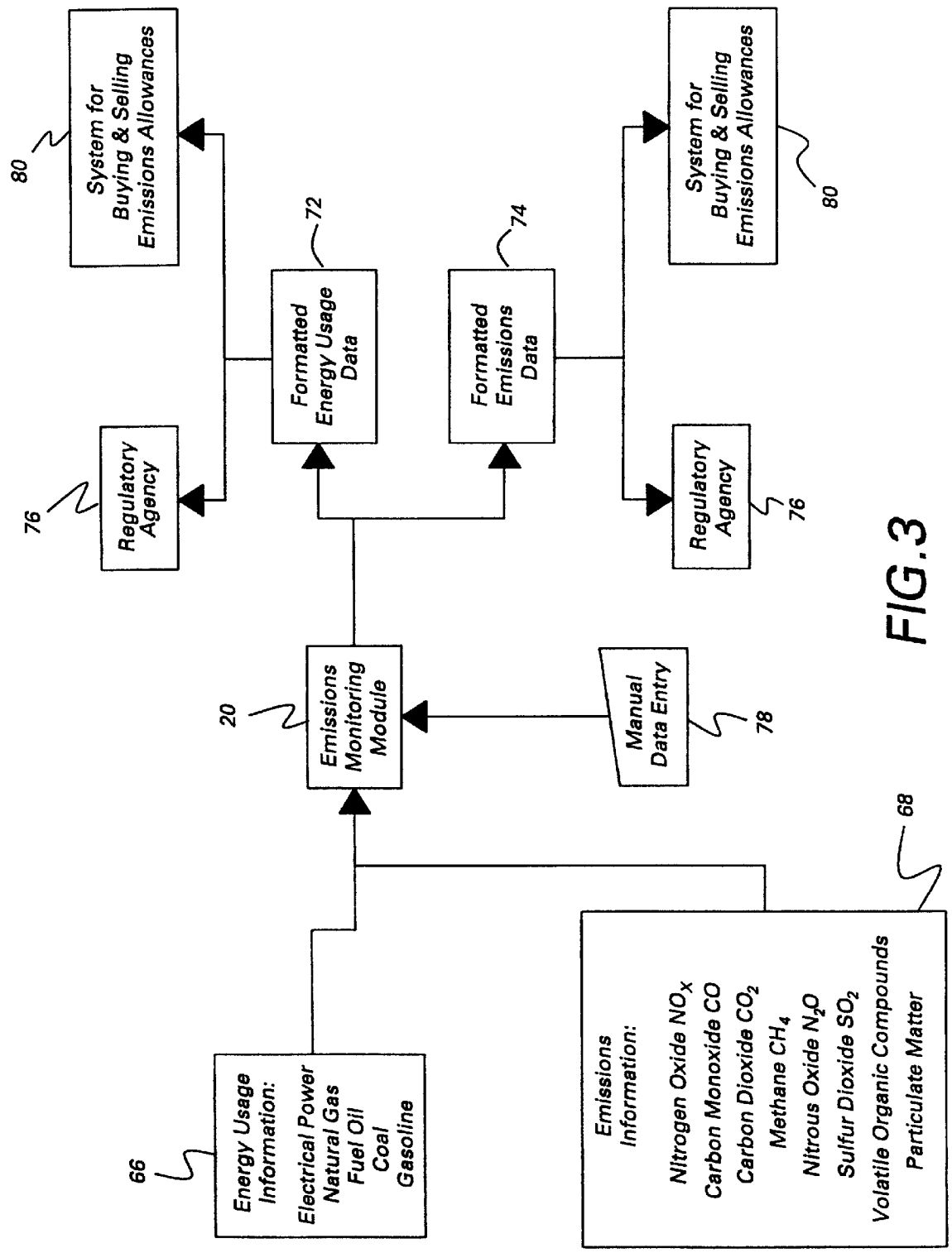
FIG. 3 is a block diagram describing one embodiment of the Emissions Monitoring Module.

FIG. 3 is a block diagram describing one embodiment of the Emissions Monitoring Module 20. The Emissions Monitoring Module 20 acquires information from the communications network (shown as reference numeral 48 in FIG. 2) and uses this information to track, predict, and model emissions outputs from multiple sources. As FIG. 3 illustrates, the Emissions Monitoring Module 20 acquires energy usage information 66 and emissions information 68 and stores this information in a database 70. The energy usage information 66 may include, yet is not limited to, electrical power usage, natural gas usage, fuel oil usage, coal usage, and gasoline usage. The emissions information 68 may include, yet is not limited to, nitrogen oxides ($NO_X$), carbon monoxide (CO), carbon dioxide ($CO_2$) methane ($CH_4$), nitrous oxide ($N_2O$), sulfur dioxide ($SO_2$), volatile organic compounds, and particulate matter. The Emissions Monitoring Module 20 could also acquire other plant variables, such as plant productivity and operating variables. The Emissions Monitoring Module 20 acquires this information from multiple emissions sources, and this information is used to predict and to model emissions outputs from those multiple sources in a complex industrial process. The Emissions Monitoring Module 20 thus supplies emissions profiles that help plant operators understand emissions releases. The Emissions Monitoring Module 20 also provides real time data, or near-real time data, that allows plant operators to adjust modes of operation, to review compliance levels, and to trade emissions credits on-line.

The Emissions Monitoring Module 20 may also report emissions data to governmental regulatory agencies. As FIG. 3 shows, the Emissions Monitoring Module 20 may communicate the acquired information to a regulatory agency. The Emissions Monitoring Module 20 could thus format the acquired energy usage information 66 and the emissions information 68 to the reporting requirements of, for example, the Environmental Protection Agency. The Environmental Protection Agency requires the reporting of $SO_X$, $NO_X$, and other pollutants to fulfill air permitting needs. See 42 U.S.C.A. §7651(k) (West 1995 & Supp. 2000). Europe, too, requires industrial reductions in emissions. The Emissions Monitoring Module 20 may communicate formatted energy usage data 72, and formatted emissions data 74, along the communications network, in real-time and on-line, to a regulatory agency 76. The Emissions Monitoring Module 20 may even accept manually-entered data 78 from plant operators, engineers, and others with access to the database 70. The Emissions Monitoring Module 20 thus reduces, and could even eliminate, the need for plant personnel to monitor and to report emissions outputs information.

The Emissions Monitoring Module 20 is also advantageous for emissions trading programs. As the Environmental Protection Agency allows, affected sources of pollutant emissions can buy and sell emission allowances on the open market. See 42 U.S.C. §7651(b) (West 1995 & Supp. 2000). Participants in this market-based system for buying and selling emissions allowances can use the Emissions Monitoring Module 20 to track, monitor, and report emissions levels. Participants can also use the Emissions Monitoring Module 20 to verify the allowances offered by other participants. The Emissions Monitoring Module 20 may communicate the formatted energy usage data 72 and the formatted emissions data 74 along the communications network to participants 80 in this market-based system for buying and selling emissions allowances. The Emissions Monitoring Module 20 thus provides a single, on-line, real-time, or near-real-time, source for verifying, buying, and selling emissions allowances.

The Emissions Monitoring Module 20 also improves energy and emissions management programs. Because multiple emissions sources can be tracked, the Emissions Monitoring Module 20 allows engineers to monitor and to characterize variations in energy usage and emissions between different operations and between different plants. The Emissions Monitoring Module 20 thus helps identify and share the best energy and emissions practices. Because the Emissions Monitoring Module 20 provides a real-time measurement of energy usage, or a near-real-time measurement, dispersed plant locations can easily leverage aggregate purchases of energy requirements. Even diverse industries can band together and make aggregate, on-line purchases of their energy requirements. The Emissions Monitoring Module 20 also provides actual energy data for utility rate negotiations and actual emissions data for air quality programs. The Emissions Monitoring Module 20, in addition, allows plant operators to forecast emissions based upon production targets. Because the Emissions Monitoring Module 20 maintains a database of energy usage and emissions data, this data can be correlated to production measurements. Plant operators can thus forecast future energy requirements and emissions based upon past data and production goals. Plant operators may thus optimize production to keep the plant in compliance.

Figure 4:
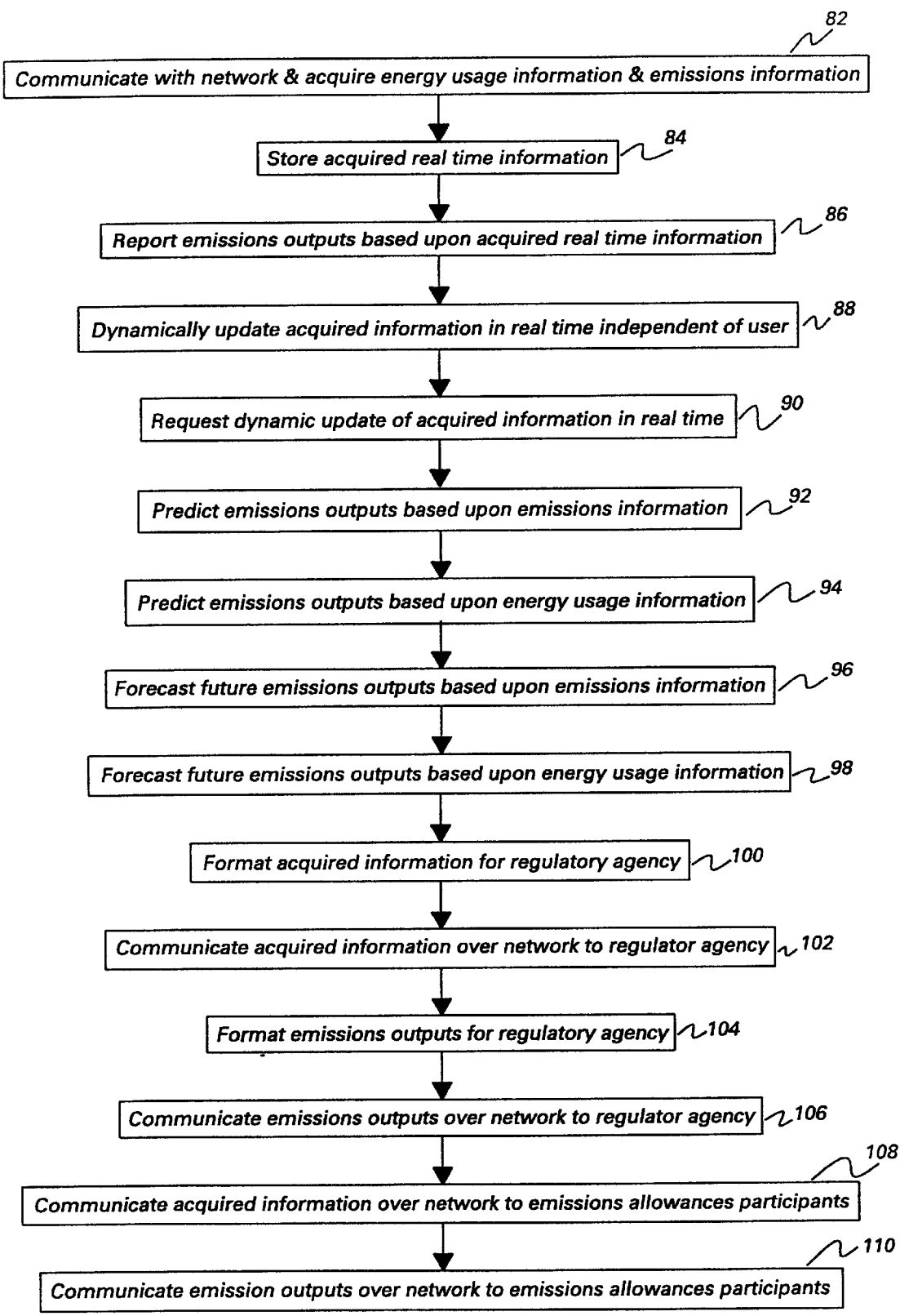
FIG. 4 is a block diagram of a method for determining emissions outputs from an industrial source.

FIG. 4 is a flowchart of a method of determining emissions outputs from an industrial source. The method communicates with the communications network and acquires at least one of energy usage information associated with sources of emissions and emissions information associated with sources of emissions (Block 82). "Sources of emissions," as mentioned before, includes any machine, apparatus, plant, or process that emits pollutants. The acquired information is stored as each occurs in real time (Block 84). The method reports emissions outputs for the industrial process, with the emissions outputs based upon the acquired real time information (Block 86). The acquired information may be dynamically updated in real time independent of any intervention by a human user (Block 88). A human user may also request a dynamic update of the acquired information in real time (Block 90). Emissions outputs may be predicted based upon the emissions information (Block 92), based upon the energy usage information (Block 94), or based upon other plant variables (such as whether an incinerator, for example, is simply "on" or "off"). Future emissions outputs may be forecasted based upon the emissions information (Block 96) or based upon the energy usage information (Block 98). The acquired information may be formatted to the requirements of a regulatory agency (Block 100) and communicated over the communications network to the regulatory agency (Block 102). The emissions outputs may be formatted to the requirements of a regulatory agency (Block 104) and communicated over the communications network to the regulatory agency (Block 106). The acquired information may be communicated over the communications network to participants in a system for buying and selling emissions allowances (Block 108). The emissions outputs may be communicated over the communications network to participants in the system for buying and selling emissions allowances (Block 110). The emissions outputs could also be communicated over the communications network as part of an energy management service.

Figure 5:
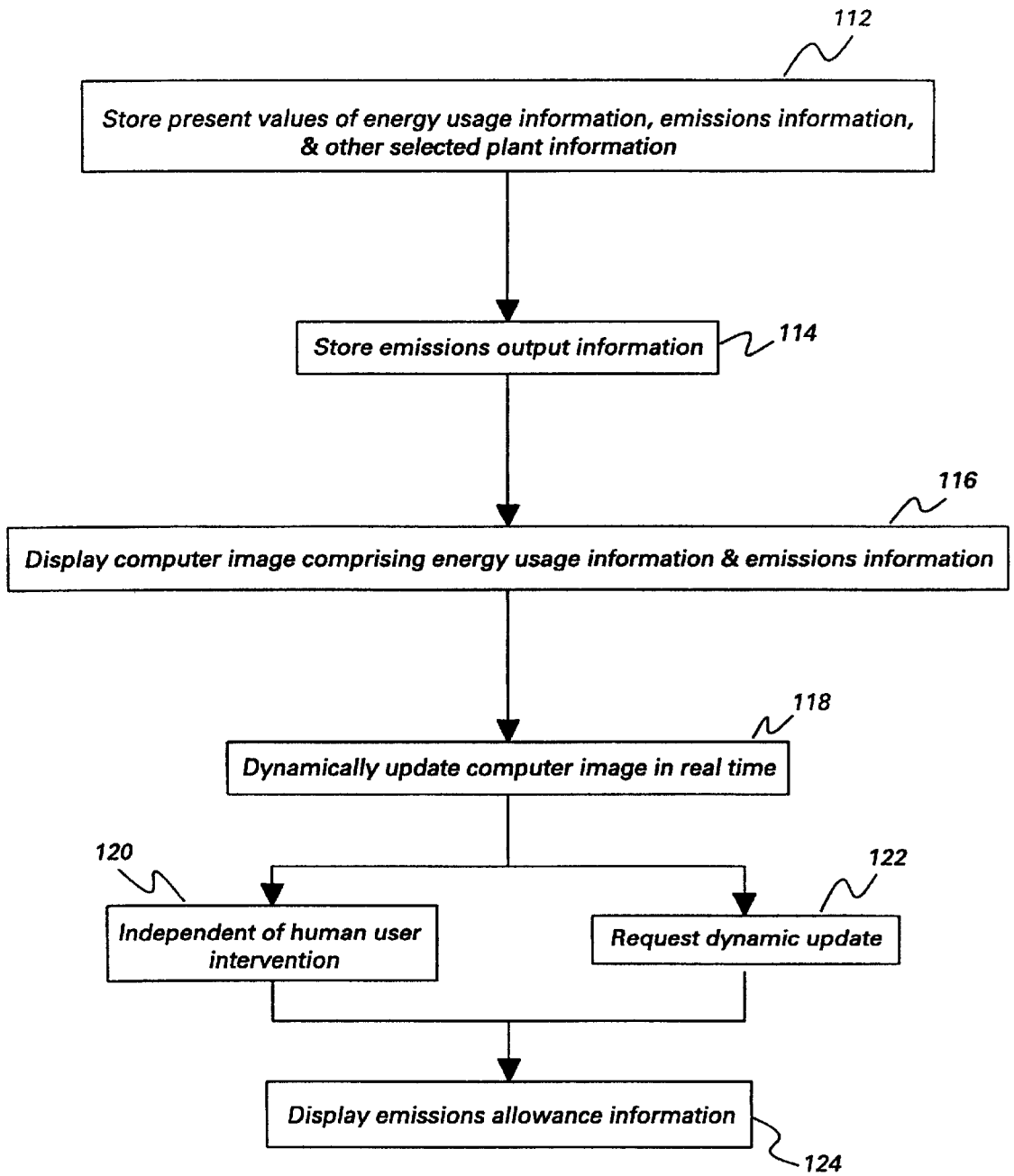
FIG. 5 is a block diagram of a method for displaying energy and emissions information;.

FIG. 5 is a flowchart of a method of displaying energy and emissions information. This method describes methods for displaying energy and emissions information on monitors, flat panel displays, mobile computers, mobile devices, personal data assistants, mobile phones, satellite-communication devices, and other devices visually-presenting energy and emissions information. The method stores present values of at least one of i) energy usage information and ii) emissions information as each occurs in real time (Block 112). The energy usage information is associated with sources of emissions, and the emissions information is associated with sources of emissions. Emissions output information is stored (Block 114), with the emissions output information based upon at least one of the energy usage information and the emissions information. A computer image is displayed, with the computer image comprised of at least one of i) the energy usage information, ii) the emissions information, and the iii) emissions output information (Block 116). The computer image may be dynamically updated in real time (Block 118), independent of intervention by a user (Block 120), or by requesting a dynamic update of the image (Block 122). The computer image may display emissions allowance information associated with a system for buying and selling emissions allowances (Block 124).

Figure 6:
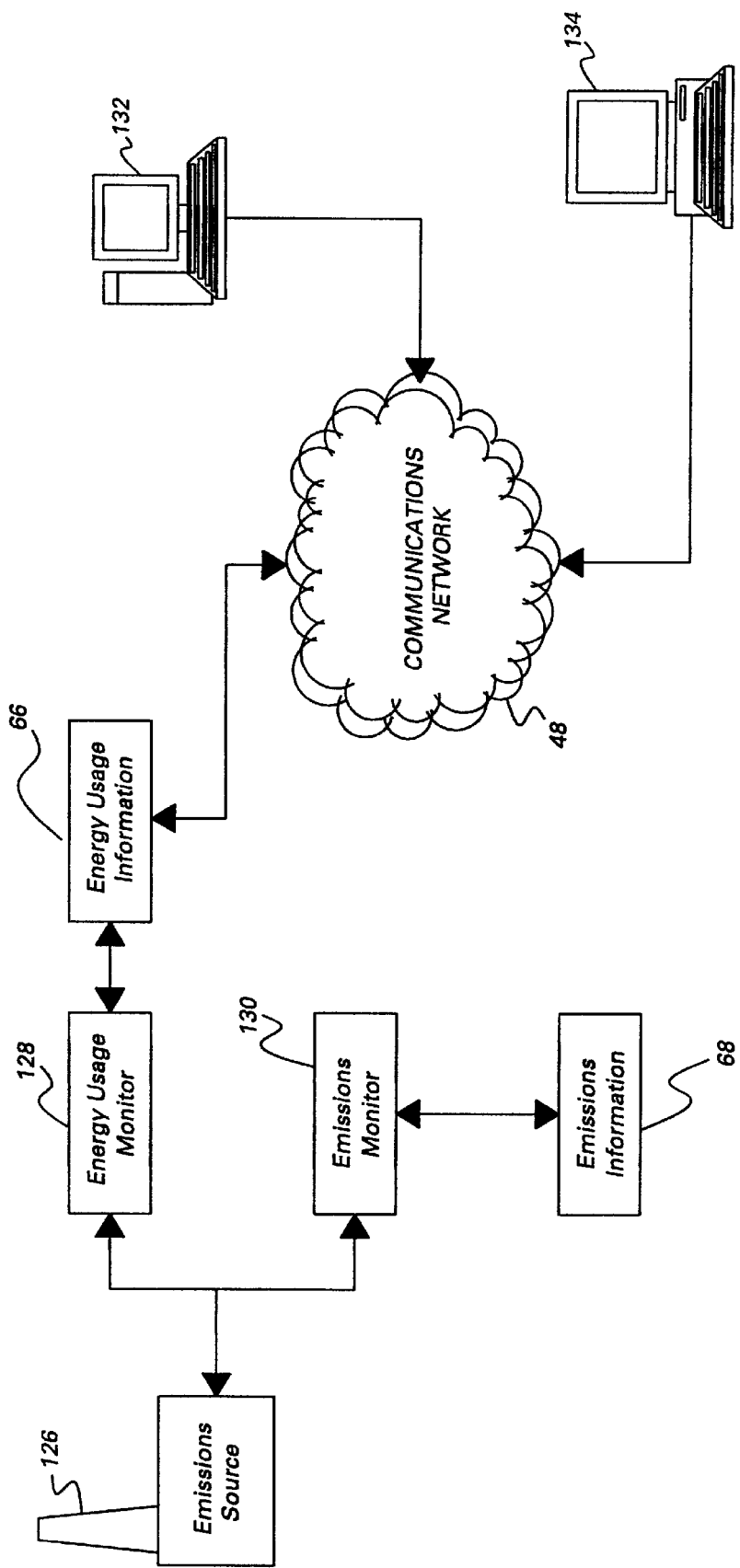
FIG. 6 is a schematic diagram of an industrial process.

FIG. 6 is a schematic diagram of an industrial process. An emissions source 126 produces pollutant emissions. At least one energy usage monitor 128 may monitor, in real time, the energy usage of the emissions source. At least one emissions monitor 130 may monitor, in real time, the pollutant emissions produced by the emissions source. The at least one energy usage monitor 128 generates the energy usage information 66. The at least one emissions monitor 130 generates the emissions information 68. The term "monitor" includes meters, sensors, and other measuring/metering devices, yet, the term "monitor" also includes any analog-to-digital conversion devices or other electrical enhancements that enable the measuring/metering device to acquire and to share the energy usage information 66 and the emissions information 68 along the communications network 48. See, e.g., The American Heritage Dictionary 810 (1991). The communications network 48, therefore, acquires at least one of the energy usage information 66 and the emissions information 68. The communications network communicates in real time, or in near-real-time, the energy usage information 66 and the emissions information 68 to computers connected, physically or wirelessly, to the communications network 48. The communication network 48 may comprise, for example, at least one reporting computer 132. The at least one reporting computer 132 receives at least one of the energy usage information 66 and the emissions information 68 from the communication network 48. The at least one reporting computer 132 reports the pollutant emissions produced by the emissions source 126. The pollutant emissions produced by the emissions source 126, and reported by the reporting computer 132, may be based upon at least one of the energy usage information 66 and the emissions information 68. The communication network 48 may also comprise at least one emissions prediction computer 134. The at least one emissions prediction computer 134 predicts the pollutant emissions produced by the emissions source 126. The pollutant emissions predicted by the at least one emissions prediction computer 134 may be based upon at least one of the energy usage information 66 and the emissions information 68.

The Emissions Monitoring Module 20 may be physically embodied on or in a computer-readable medium. This computer-readable medium may be CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the Emissions Monitoring Module 20 to be easily disseminated. A computer program product for tracking, monitoring, and reporting energy usage and emissions comprises a computer-readable medium and the Emissions Monitoring Module. The Emissions Monitoring Module is stored on the medium, and the Emissions Monitoring Module couples to energy usage monitors and to emissions monitors over a communication network. The Emissions Monitoring Module acquires at least one of energy usage information associated with sources of emissions and emissions information associated with sources of emissions.

EXAMPLE

The Emissions Monitoring Module 20 is further illustrated by the following non-limiting example. This non-limiting example reflects a prototype industrial demonstration. The Emissions Monitoring Module 20 monitors natural gas (NG) usage, and production measurements were taken, so all information was known in order to track and to predict very conservative estimates of actual emissions. As those of ordinary skill in the art understand, emissions permits sometimes allow the use of mathematical models for predicting emissions based upon energy usage. The transfer functions for $NO_X$, $SO_X$, and $CO_2$, as a function of natural gas (NG) usage, are below:

$$NO_X(\text{lb/day}) = (\text{Machine ``A''}) + (\text{Recuperator ``A''}) + NG \text{ Applications}$$
$$= C_1 + C_2 + 100[(NG \text{ usage in mmcf/day}) - C_3]$$
$$= 423.4 + 41.7 + 100[(NG \text{ usage in mmcf/day}) - 0.733].$$

Here the local permit assumes $NO_X$ from Machine "A" and from Recuperator "A" are constant. $NO_X$ from other NG applications can be fitted to a simple expression.

$$SO_X(\text{lb/day}) = (\text{Machine ``B''}) + NG \text{ Applications}$$
$$= C_4 + 0.6(NG \text{ usage in mmcf/day})$$
$$= 6.67 + 0.6(NG \text{ usage in mmcf/day}); \text{ and}$$
$$CO_2(\text{lb/day}) = (\text{Reactor ``A''}) + (\text{Reactor ``B''}) +$$
$$(\text{Machine ``B''}) + NG \text{ Applications}$$
$$= C_5 + C_6 + C_7 + 60(NG \text{ usage in mmcf/day})$$
$$= 23.1 + 38.2 + 10.2 + 60(NG \text{ usage in mmcf/day})$$

where the constants $C_1, C_2, \ldots C_7$ approximate sources of emissions that are independent of natural gas usage. In this example, natural gas, for example, accounts for only about ten percent (10%) of $NO_X$ emissions, about ten percent (10%) of $SO_X$ emissions, and about fifty percent (50%) of $CO_2$ emissions from combustion sources.

A few machines, for example, account for a majority of energy usage and of emissions. Although the Emissions Monitoring Module 20 monitored the natural gas usage of just two (2) emissions sources, these two sources accounted for ninety percent (90%) of $NO_X$ emissions. A single waste stream, similarly, accounts for eighty nine percent (89%) of $SO_X$ emissions. Four (4) waste streams account for nearly one hundred percent (100%) of $CO_2$ emissions. Additional monitoring of natural gas usage at a few other sources would account for one hundred percent (100%) of $NO_X$ and $SO_X$ emissions. The Emissions Monitoring Module 20 acquires natural gas usage on an hourly schedule, and each transfer function can thus be updated on an hourly basis. A direct measurement of $NO_X$ emissions validates the transfer function.

While the present invention has been described with respect to various features, aspects, and embodiments, those of ordinary skill in the art, and those unskilled, will recognize the invention is not so limited. Other variations, modifications, and alternative embodiments may be made without departing from the spirit and scope of the present invention.

What is claimed is:

1. A method of determining emissions outputs from an industrial process, comprising:

communicating with a communications network; and acquiring at least one of energy usage information associated with sources of emissions and emissions information associated with sources of emissions, the energy usage information and the emissions information acquired as each occurs in real time or near real time;

deriving a mathematical model based upon at least one of the energy usage information and at least one of the emissions information;

determining emissions according to said mathematical model from real time or near real time energy usage information, wherein emissions are determined according to a transfer function that sums approximate emissions from a constant emission source model and emissions according to an amount of usage of a variable emission source wherein the constant emission source model is periodically updated and the amount of usage of the variable emission source is periodically measured and reporting the emissions over the communications network.

2. A method of determining emissions outputs according to claim 1, further comprising forecasting future emissions outputs based upon the emissions information.

3. A method of determining emissions outputs according to claim 1, further comprising forecasting future emissions outputs based upon the energy usage information.

4. A method of determining emissions outputs according to claim 1, further comprising communicating the acquired information over the communications network to a regulatory agency.

5. A method of determining emissions outputs according to claim 1, further comprising communicating the emissions outputs over the communications network to a regulatory agency.

6. A method of determining emissions outputs according to claim 1, further comprising communicating the acquired information over the communications network to participants in a system for buying and selling emissions allowances.

7. A method of determining emissions outputs according to claim 1, further comprising communicating the emissions outputs over the communications network to participants in a system for buying and selling emissions allowances.

8. A method of determining emissions outputs according to claim 1, further comprising formatting the acquired information to the requirements of a regulatory agency.

9. A method of determining emissions outputs according to claim 1, further comprising formatting the emissions outputs to the requirements of a regulatory agency.

10. An industrial process, comprising:

an emissions source producing pollutant emissions;

at least one of i) an energy usage monitor for monitoring energy usage of the emissions source in real time and ii) an emissions monitor for monitoring emissions produced by the emissions source in real time, the energy usage monitor generating energy usage information and the emissions monitor generating emissions information; and a communications network acquiring at least one of the energy usage information and the emissions information, the communications network communicating the energy usage information and the emissions information to a processor having a set of instructions to derive emissions information according to a transfer function that sums approximate emissions from a constant emission source model and emissions according to an amount of usage of a variable emission source wherein the constant emission source model is periodically updated and the amount of usage of the variable emission source is periodically measured.

11. An industrial process according to claim 10, wherein the energy usage monitor monitors at least one of electrical usage, natural gas usage, fuel oil usage, coal usage, and gasoline usage.

12. An industrial process according to claim 10, wherein the emissions monitor monitors at least one of $NO_x$, $SO_x$, $CH_4$, $N_2O$, $CO_2$, and CO.

13. A system configured for predicting emissions from an emissions source, the system comprising:

an Emissions Monitoring Module acquiring at least one of energy usage information and emissions information, the energy usage information associated with energy used by the emissions source, and the emissions information associated with emissions outputs produced by the emissions source;

a memory storage device storing the acquired information; and a processor having a set of instructions to derive a mathematical model based upon the acquired information and to generate emissions outputs for the emissions source based upon the mathematical model and acquired information; wherein the processor has a set of instructions to generate the emissions outputs according to a transfer function that sums approximate emissions from a constant emission source model and emissions according to an amount of usage of a variable emission source wherein the constant emission source model is periodically updated and the amount of usage of the variable emission source is periodically measured.

14. A computer program product on a computer readable medium in a data processing system for determining emissions outputs from an industrial process, the computer program product comprising instructions for:

(i) communicating with a communications network, (ii) acquiring at least one of energy usage information associated with a variable source of emissions and acquiring emissions information associated with substantially constant sources of emissions, the energy usage information and the emissions information acquired as each occurs in real time, (iii) deriving a constant emission source model based upon the acquired emissions information and (iv) determining emissions outputs according to a transfer function that sums an amount of the at least one of energy usage information of the variable emission source and approximate emissions from the constant emission source model wherein usage of the variable emission source is periodically measured and the constant emission source model is periodically updated; and reporting the emissions outputs based upon the acquired real time information.

15. A computer program product for determining emissions outputs according to claim 14, further comprising instructions for forecasting future emissions outputs based upon the emissions information.

16. A computer program product for determining emissions outputs according to claim 14, further comprising instructions for forecasting future emissions outputs based upon the energy usage information.

17. A computer program product for determining emissions outputs according to claim 14, further comprising instructions for communicating the acquired information over the communications network to a regulatory agency.

18. A computer program product for determining emissions outputs according to claim 14, further comprising instructions for communicating the emissions outputs over the communications network to a regulatory agency.

19. A computer program product for determining emissions outputs according to claim 14, further comprising instructions for communicating the acquired information over the communications network to participants in a system for buying and selling emissions allowances.

20. A computer program product for determining emissions outputs according to claim 14, further comprising instructions for communicating the emissions outputs over the communications network to participants in a system for buying and selling emissions allowances.

21. A computer program product for determining emissions outputs according to claim 14, further comprising instructions for formatting the acquired information to the requirements of a regulatory agency.

22. A computer program product for determining emissions outputs according to claim 14, further comprising instructions for formatting the emissions outputs to the requirements of a regulatory agency.

23. A method of determining and communicating emissions information, comprising:

acquiring present values of i) energy usage information and ii) emissions information, the energy usage information associated with sources of emissions, and the emissions information associated with sources of emissions;

deriving from the acquired information, a mathematical model for determining emissions from the energy usage information associated with sources of emissions, and the emissions information associated with sources of emissions; and determining emissions on a real time or near real time basis from application of the mathematical model to real time or near real time energy usage information wherein emissions on a real time or near real time basis are determined according to a transfer function that sums approximate emissions from a constant emission source model and emissions according to an amount of usage of a variable emission source wherein the constant emission source model is periodically updated and the amount of usage of the variable emission source is periodically measured; and communicating the emissions over a communications network.

24. The method of claim 23, further comprising displaying an image representing determined emissions associated with real time or near real time energy usage.

* * * * *

UNITED STATES PATENT AND TRADEMARK OFFICE
CERTIFICATE OF CORRECTION

PATENT NO. : 6,732,055 B2
DATED : May 4, 2004
INVENTOR(S) : Srinivas Krishnaswamy Bagepalli et al.

It is certified that error appears in the above-identified patent and that said Letters Patent is hereby corrected as shown below:

Title page,
Line 75, Inventors, please correct name of inventor from "Srinivas Krishnasnamy Bagepalli" to -- Srinivas Krishnaswamy Bagepalli --.

Signed and Sealed this

Seventh Day of September, 2004

JON W. DUDAS
*Director of the United States Patent and Trademark Office*